US012305855B2

(12) United States Patent
Zhou et al.

(10) Patent No.: US 12,305,855 B2
(45) Date of Patent: May 20, 2025

(54) AIR-FUEL MIXER AND COMBUSTION SYSTEM

(71) Applicant: Siemens Aktiengesellschaft, Munich (DE)

(72) Inventors: Wen Quan Zhou, Shanghai (CN); Jun Cai, Shanghai (CN); Shuai Shuai Yi, Shanghai (CN); Xiao Jun Zhao, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 410 days.

(21) Appl. No.: 17/784,876

(22) PCT Filed: Jul. 17, 2020

(86) PCT No.: PCT/IB2020/056734
§ 371 (c)(1),
(2) Date: Jun. 13, 2022

(87) PCT Pub. No.: WO2021/116783
PCT Pub. Date: Jun. 17, 2021

(65) Prior Publication Data

US 2023/0010579 A1 Jan. 12, 2023

(30) Foreign Application Priority Data

Dec. 13, 2019 (CN) ......................... 201911279906.0
Dec. 13, 2019 (CN) ......................... 201922250746.9

(51) Int. Cl.
*F23N 1/02* (2006.01)
*B01F 23/10* (2022.01)
(Continued)

(52) U.S. Cl.
CPC ............ *F23N 1/025* (2013.01); *B01F 23/191* (2022.01); *B01F 25/312531* (2022.01);
(Continued)

(58) Field of Classification Search
CPC .......... F23D 14/02; F23D 14/62; F23N 1/025; F23N 2235/10; F23N 2235/06;
(Continued)

(56) References Cited

U.S. PATENT DOCUMENTS 1,983,255 A * 12/1934 Wahlmark ........... F02M 9/1275 261/DIG. 39
3,953,548 A * 4/1976 Knapp ................... F02M 69/04 261/50.2
5,240,409 A 8/1993 Xiong ........................... 431/189

FOREIGN PATENT DOCUMENTS

CN 202719608 2/2013 ............. F23D 14/64
CN 107927068 4/2018 ............. A21D 13/06
(Continued)

OTHER PUBLICATIONS

Search Report for International Application No. PCT/IB2020/056734, 10 pages, Oct. 12, 2020.

*Primary Examiner* — Vivek K Shirsat
(74) *Attorney, Agent, or Firm* — Slayden Grubert Beard PLLC

(57) ABSTRACT

Various embodiments of the teachings herein include a mixer disposed in a fuel gas combustion system and mixing air and fuel gas to form flammable mixed gases. The mixer may include: a Venturi tube having an air inlet, a fuel gas inlet, a gas mixture outlet, a central axis direction, and a throat positioned between the air inlet and the gas mixture outlet in the central axis direction, wherein the fuel gas inlet is disposed at the throat; and an adjustment component disposed in the Venturi tube downstream of the throat, the adjustment component drivable to move towards or away
(Continued)

from the throat in the central axis direction, thereby changing a flow area of gas in the Venturi tube. The adjustment component comprises a conical valve plug with a conical outer surface thereof at a side facing towards the throat and fitting an inner surface of the Venturi tube.

6 Claims, 4 Drawing Sheets

(51) Int. Cl.
*B01F 25/312* (2022.01)
*B01F 101/00* (2022.01)
*F23D 14/62* (2006.01)

(52) U.S. Cl.
CPC ........ *F23D 14/62* (2013.01); *B01F 2101/501* (2022.01); *F23N 2225/04* (2020.01); *F23N 2225/14* (2020.01); *F23N 2235/06* (2020.01); *F23N 2235/10* (2020.01)

(58) Field of Classification Search
CPC ............. F23N 2225/04; F23N 2225/14; B01F 23/191; B01F 25/312531; B01F 2101/501
USPC ....................................... 261/DIG. 56; 431/9
See application file for complete search history.

(56) References Cited

FOREIGN PATENT DOCUMENTS

| | | | |
|---|---|---|---|
| CN | 209605156 | 11/2019 | ............. F23D 14/04 |
| EP | 0 064 018 | 11/1982 | .............. F04B 39/02 |
| EP | 3 006 827 | 4/2016 | ............. F23D 14/60 |
| EP | 2 686 609 | 4/2019 | ............. F23D 14/64 |

* cited by examiner

AIR-FUEL MIXER AND COMBUSTION SYSTEM

CROSS-REFERENCE TO RELATED APPLICATIONS

This application is a U.S. National Stage Application of International Application No. PCT/IB2020/056734 filed Jul. 17, 2020, which designates the United States of America, and claims priority to CN Application No. 201911279906.0 filed Dec. 13, 2019, and CN Application No. 201922250746.9 filed Dec. 13, 2019, the contents of which are hereby incorporated by reference in their entirety.

TECHNICAL FIELD

The present disclosure generally relates to the field of fuel gas combustion. Various embodiments of the teachings herein include mixers for premixing air and fuel gas in a fuel gas combustion system and/or combustion systems having such a mixer.

BACKGROUND

Fuel gas combustion can be categorized as diffusion combustion, partially premixed combustion (atmospheric combustion), or fully premixed combustion. Fully premixed combustion refers to a process in which air and fuel gas are fully mixed in a certain ratio in advance to form premixed gases, which are then ignited and burnt in a burner. Premixed combustion generally takes place in a relatively closed system. In premixed combustion, due to the fact that fuel gas and air (oxygen) are fully mixed before combustion, the flame has a faster propagation speed, a higher combustion temperature and better expansion properties than in diffusion combustion, and so premixed combustion is widely used in industrial boilers.

A typical premixed combustion system generally employs a Venturi mixer to ensure that air and fuel gas are fully mixed in a certain ratio, and uses a fan to deliver the premixed gases into the burner. The mixing of fuel gas and air may be configured to take place at a fan inlet, and is called “upstream premixing”. The mixing of fuel gas and air may also be configured to take place at a fan outlet, and is called “downstream premixing”.

At present, the use of upstream premixing systems is predominant on the market. Due to the fact that the mixing of fuel gas and air takes place at the fan inlet in a upstream-premixed combustion system, a special-purpose EC (Electrical Commutation) fan is needed, i.e. a fan having a DC brushless variable frequency motor; this is expensive, and standards require that the power of EC fans be no more than 2.8 MW.

In a downstream-premixed combustion system, the mixer is subject to very exacting requirements, due to the short mixing distance.

At present, static downstream-premixing mixers are usually seen on the market; these have a static, fixed Venturi tube structure. This type of static downstream-premixing mixer struggles to achieve a high adjustment ratio when the load is low, the reason being that when the load is low, the effectiveness of mixing air and fuel gas is poor due to the low flow speed, resulting in deterioration of the combustion working conditions; this has restricted the popularization and use of downstream-premixing systems on the market to a large extent. In order to improve the mixing result, the majority of downstream-premixing mixers of some existing manufacturers employ the method of adding swirl plates or increasing flow path resistance, but the internal mechanical structure of the mixer is still a static structure, and is likewise unable to adapt to low load situations. Thus, there is a need to develop a mixer suitable for a high-power downstream-premixing system, to expand the scope of application of fully premixed combustion.

SUMMARY

In view of the above, the teachings of the present disclosure include mixers for a downstream-premixed combustion system, which are capable of effectively improving a mixing result in a low load situation, i.e. a low flow speed situation. Further, the teachings describe mixers capable of achieving a high adjustment ratio when the flow speed at a low heat setting is low with low requirements for fuel gas pressure and are not only capable of achieving gas flow rate adjustment, but also enable a flow rate adjustment apparatus to be integrated in the mixer, simplifying the structure of the combustion system.

For example, some embodiments include a mixer, disposed in a fuel gas combustion system and mixing air and fuel gas to form flammable mixed gases, wherein the mixer comprises: a Venturi tube (32), having an air inlet (321), a fuel gas inlet (322) and a gas mixture outlet (323), the Venturi tube (32) having a central axis direction (A) and a throat (325) positioned between the air inlet (321) and the gas mixture outlet (323) in the central axis direction, the fuel gas inlet (322) being disposed at the throat (325); an adjustment component (34), disposed in the Venturi tube (32) and located downstream of the throat, the adjustment component (34) being drivable to move towards or away from the throat (325) in the central axis direction, thereby changing a flow area of gas in the Venturi tube (32), characterized in that the adjustment component (34) is a conical valve plug, and a conical outer surface thereof at a side facing towards the throat (325) fits an inner surface of the Venturi tube (32) at the throat (325).

In some embodiments, there is a drive mechanism (36) for driving the adjustment component (34), the drive mechanism (36) comprising: a central shaft (361), positioned in the Venturi tube (32) in such a way as to be capable of reciprocating in the central axis direction, the adjustment component (34) being fitted around and fixed to the central shaft (361); a transmission assembly (363), having one end connected to the central shaft (361) and another end connected to an actuator (60), the transmission assembly (363) impelling the central shaft (361) to move under the driving action of the actuator (60).

In some embodiments, the transmission assembly (363) comprises: a transmission shaft (363-1), extending in a direction perpendicular to the central axis direction, and rotating under the driving action of the actuator (60); a shaft levering device (363-2), having one end connected to the transmission shaft (363-1) in a fixed manner and another end connected to the central shaft (361), wherein the transmission shaft (363-1) rotates and drives the shaft levering device (363-2), the shaft levering device (363-2) in turn pushing the central shaft (361) to move linearly along the central axis.

In some embodiments, the shaft levering device (363-2) is fitted around the transmission shaft (363-1) in a fixed manner, and the shaft levering device (363-2) has two lever parts (T) extending in a direction perpendicular to the transmission shaft (363-1), the two lever parts (T) being arranged to be spaced apart parallel to one another and being configured such that the central shaft (361) is adapted to be positioned therebetween, each lever part having a slot hole (L) in a length direction thereof; a connecting rod (R), adapted to pass through the slot holes (L) of the two lever parts (T) and a through-hole in the central shaft (361) positioned between the two lever parts (T), the connecting rod (R) being parallel to the transmission shaft (363-1).

As another example, some embodiments include a fuel gas combustion control system, comprising: an air channel (10), with a fan (14) disposed therein for blowing air; a fuel gas channel (20), for supplying fuel gas; a mixer (30) as claimed in any one of claims 1-5, the air inlet (321) being connected to the air channel (10), the fuel gas inlet (322) being connected to the fuel gas channel (20), and the gas mixture outlet (323) being connected to a combustion furnace (40); an actuator (60), connected to the mixer (30) and used for driving the adjustment component (34) in the mixer (30); a combustion controller (50), connected to the actuator (60) and driving the adjustment component (34) by controlling the actuator (60), in order to adjust a gas flow rate.

In some embodiments, there is a first sensor (72) for sensing a temperature and/or pressure in the combustion furnace, the combustion controller (50) being connected to the first sensor (72), and controlling the actuator (60) in response to sensing data of the first sensor (72).

In some embodiments, there is a proportional control valve (22), which causes a differential pressure of the air channel and a differential pressure of the fuel gas channel to be constant according to a ratio by means of a diaphragm mechanical structure.

In some embodiments, there is a second sensor (76), disposed at the fan (14) and used for sensing an air speed; the combustion controller (50) being connected to the second sensor (76), and pausing ignition and restarting the fan (14) in response to the second sensor (76).

In some embodiments, there is a human-machine interaction panel (90) connected to the combustion controller (50).

LIST OF LABELS USED IN THE DRAWINGS

Figure 1:
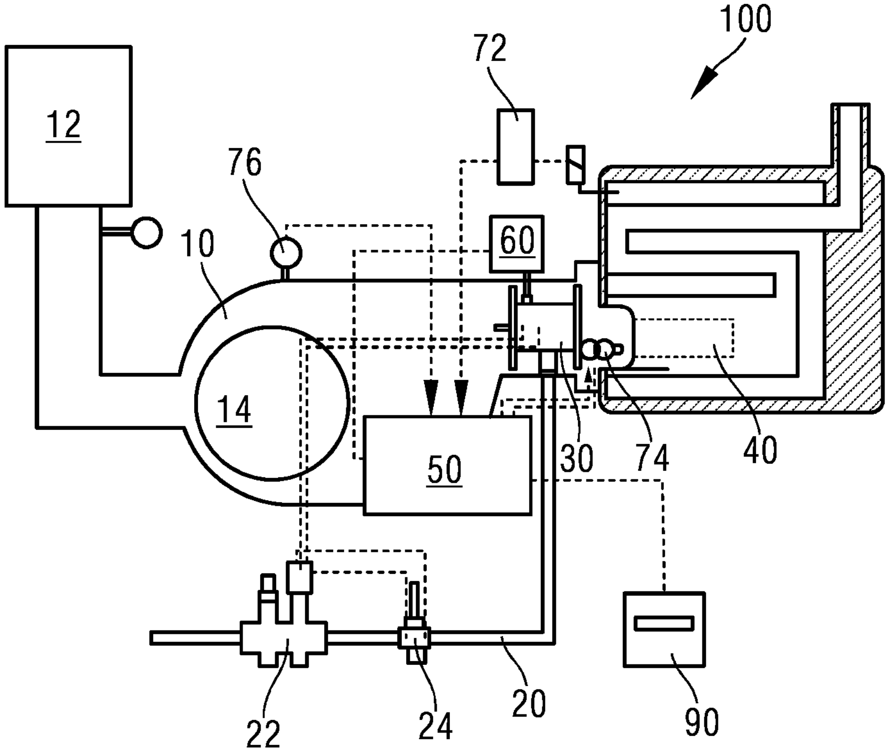
FIG. 1 is a structural schematic diagram showing a fuel gas combustion system with downstream premixing incorporating teachings of the present disclosure.

100: combustion system
10: air channel 12: air filter 14: fan
20: fuel gas channel 22: proportional control valve 24: fuel gas single valve
30: mixer
32: Venturi tube 321: air inlet 322: fuel gas inlet
323: gas mixture outlet
325: throat 34: adjustment component
36: drive mechanism 361: central shaft 363: transmission assembly 363-1: transmission shaft
363-2: shaft levering device T: lever part L: slot hole R: connecting rod
40: combustion furnace 50: combustion controller 60: actuator
72: first sensor 74: ionic probe 76: gas pressure sensor

DETAILED DESCRIPTION

In some embodiments, a mixer is disposed in a fuel gas combustion system and mixes air and fuel gas to form flammable mixed gases, wherein the mixer comprises: a Venturi tube, having an air inlet, a fuel gas inlet and a gas mixture outlet, the Venturi tube having a central axis direction and a throat positioned between the air inlet and the gas mixture outlet in the central axis direction, the fuel gas inlet being disposed at the throat; an adjustment component, disposed in the Venturi tube and located downstream of the throat, the adjustment component being drivable to move towards or away from the throat in the central axis direction, thereby changing a flow area of gas in the Venturi tube. Preferably, the adjustment component is a conical valve plug, and a conical outer surface thereof at a side facing towards the throat fits an inner surface of the Venturi tube at the throat.

In some embodiments, the mixer further comprises a drive mechanism for driving the adjustment component, the drive mechanism comprising: a central shaft, positioned in the Venturi tube in such a way as to be capable of reciprocating in the central axis direction, the adjustment component being fitted around and fixed to the central shaft; a transmission assembly, having one end connected to the central shaft and another end connected to an actuator, the transmission assembly impelling the central shaft to move under the driving action of the actuator.

In some embodiments, the transmission assembly comprises: a transmission shaft, extending in a direction perpendicular to the central axis direction, and rotating under the driving action of the actuator; a shaft levering device, having one end connected to the transmission shaft in a fixed manner and another end connected to the central shaft, wherein the transmission shaft rotates and drives the shaft levering device, the shaft levering device in turn pushing the central shaft to move linearly along the central axis.

In some embodiments, the shaft levering device is fitted around the transmission shaft in a fixed manner, and the shaft levering device has two lever parts extending in a direction perpendicular to the transmission shaft, the two lever parts being arranged to be spaced apart parallel to one another and being configured such that the central shaft is adapted to be positioned therebetween, each lever part having a slot hole in a length direction thereof; a connecting rod, adapted to pass through the slot holes of the two lever parts and a through-hole in the central shaft positioned between the two lever parts, the connecting rod being parallel to the transmission shaft.

Some embodiments of the teachings herein include a fuel gas combustion control system, comprising: an air channel, with a fan disposed therein for blowing air; a fuel gas channel, for supplying fuel gas; a mixer as described above, the air inlet being connected to the air channel, the fuel gas inlet being connected to the fuel gas channel, and the gas mixture outlet being connected to a combustion furnace; an actuator, connected to the mixer and used for driving the adjustment component in the mixer; a combustion controller, connected to the actuator and driving the adjustment component by controlling the actuator, in order to adjust a gas flow rate.

In some embodiments, the fuel gas combustion control system further comprises a first sensor for sensing a temperature and/or pressure in the combustion furnace, the combustion controller being connected to the first sensor, and controlling the actuator in response to sensing data of the first sensor. Preferably, the fuel gas combustion control system further comprises a proportional control valve, which causes a differential pressure of the air channel and a differential pressure of the fuel gas channel to be constant according to a ratio by means of a diaphragm mechanical structure. In some embodiments, the fuel gas combustion control system further comprises a second sensor, disposed at the fan and used for sensing an air speed; the combustion controller being connected to the second sensor, and pausing ignition and restarting the fan in response to the second sensor. In some embodiments, the fuel gas combustion control system further comprises a human-machine interaction panel connected to the combustion controller.

The adjustment component is used in the mixer to adjust the flow rate according to the size of the load. When the load decreases, the adjustment component moves against the gas flow direction (towards the throat), the flow area in the Venturi tube decreases, and the flow speed increases, thereby maintaining a high flow speed and high flow resistance at low flow rate/low load too; the Reynolds number increases, and the turbulence effect increases, ensuring that there is likewise a better mixing result when the heat setting in the combustion furnace is low. In addition, the mixer having dynamic adjustment capability as described above can simultaneously realize the functions of mixing and flow rate adjustment, thereby reducing the number of mixer components, and reducing costs to a certain degree.

FIG. 1 shows a combustion system 100 with downstream premixing incorporating teachings of the present disclosure. As shown in FIG. 1, the combustion system 100 comprises an air channel 10, a fuel gas channel 20, a mixer 30 connected to the air channel and the fuel gas channel, a combustion furnace 40 connected to an outlet of the mixer 30, and a combustion controller 50.

An air filter 12 is provided at an inlet of the air channel 10, for filtering foreign matter (such as dust and waste residue) mixed in air. A fan 14 is also provided in the air channel 10; the fan can blow air into the mixer 30, and then into the combustion furnace 40. The mixer 30 is positioned downstream of the fan 14. One inlet of the mixer 30 is connected to the air channel 10, and an outlet thereof is connected to the combustion furnace 40. Another inlet of the mixer 30 is connected to the fuel gas channel 20. The mixer 30 can premix air and fuel gas downstream of the fan 12, and deliver premixed gases into the combustion furnace 40. An ignitor is provided in the combustion furnace 40; under the control of the combustion controller 50, the ignitor can perform ignition such that the premixed flammable gases are fully burned.

Figure 2:
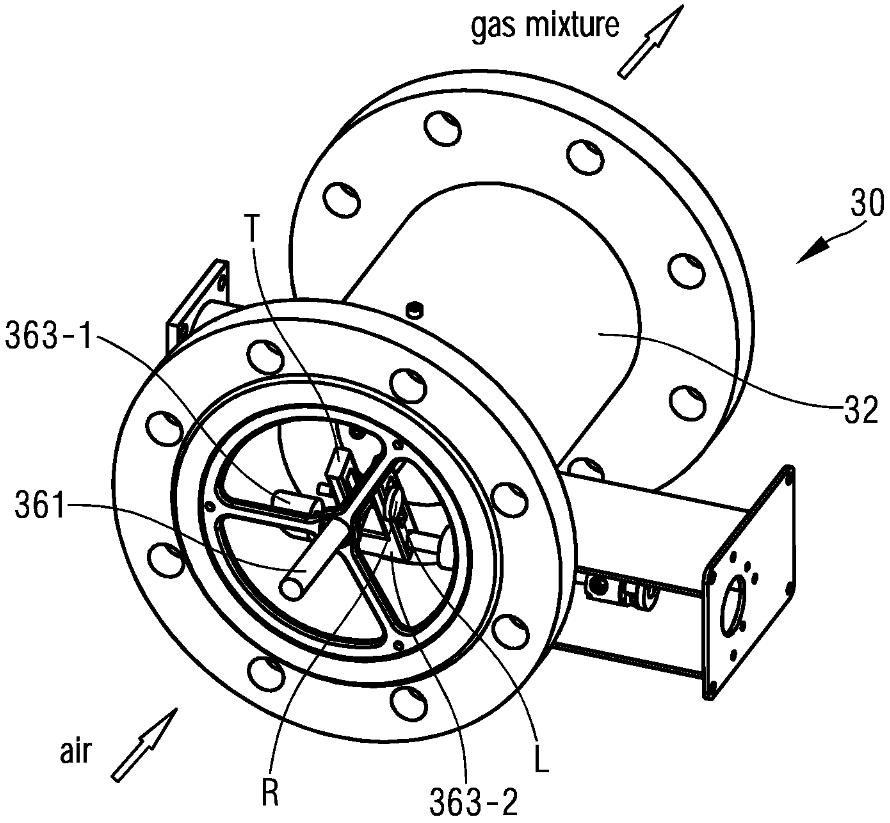
FIG. 2 is a three-dimensional drawing showing a mixer incorporating teachings of the present disclosure.
Figure 3:
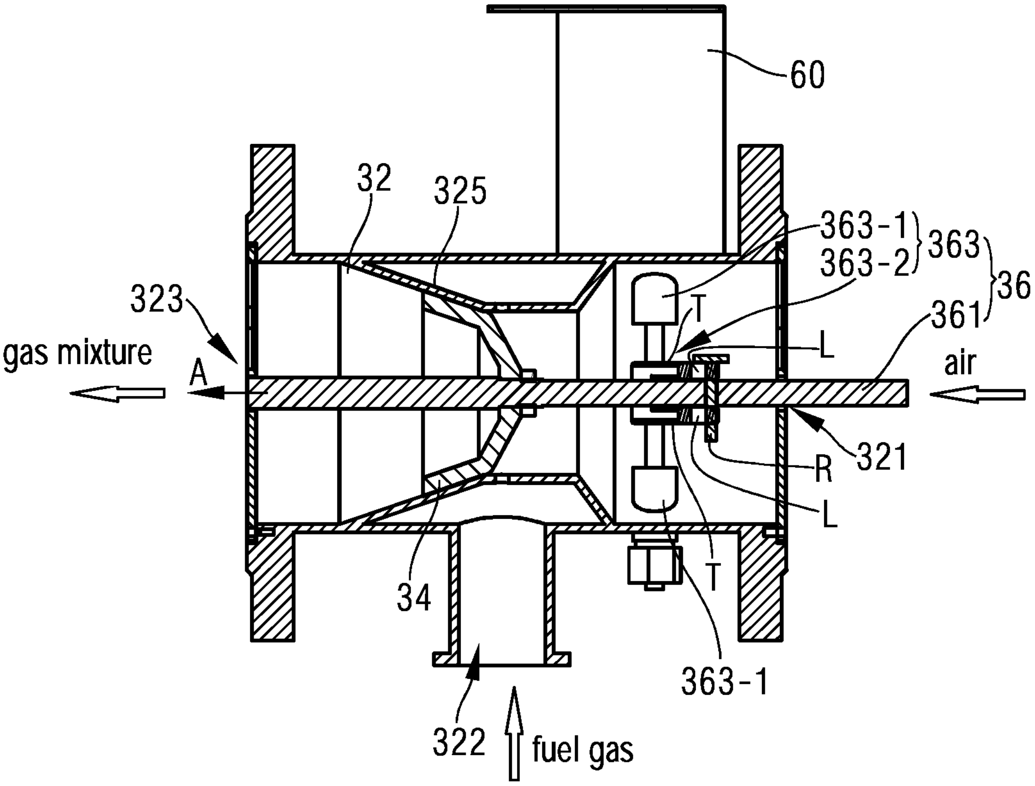
FIG. 3 is a sectional drawing showing a mixer incorporating teachings of the present disclosure.
Figure 4:
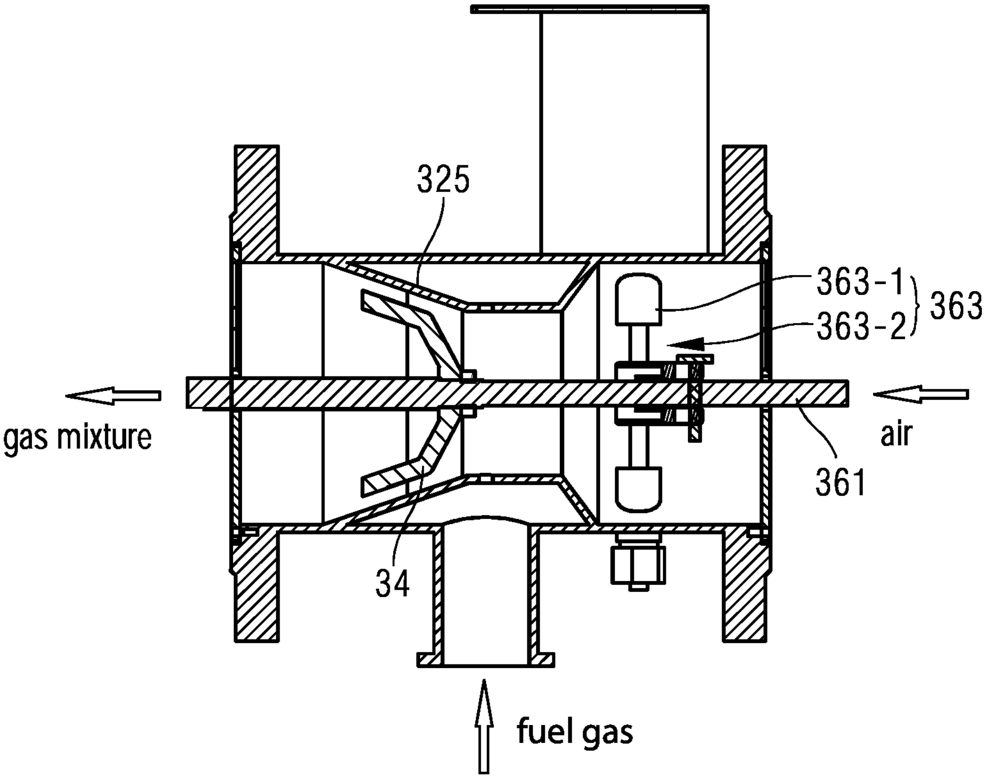
FIG. 4 is a schematic diagram showing the position of the adjustment component in a mixer under a high load incorporating teachings of the present disclosure.

In the downstream-premixed combustion system shown in FIG. 1, since the premixing of fuel gas and air takes place downstream of the fan, the downstream-premixing system has lower requirements for the fan, therefore an ordinary fan with a better price-performance ratio can be used. The downstream-premixed combustion system also has the characteristics of short mixing distance and high efficiency. This also places very high requirements on the mixer; it is necessary that the mixer be able to adapt to requirements for the air-fuel mixing result under different loads. Taking this point into consideration, the inventors of the present invention propose a mixer with an adjustable flow rate; one demonstrative structure thereof is as shown in FIGS. 2-4. The mixer can automatically adjust air quantity and fuel gas quantity according to the size of the load of the burner.

FIGS. 2-4 respectively show demonstratively a three-dimensional drawing and sectional drawings of a mixer 30 incorporating teachings of the present disclosure. As shown in FIGS. 2-4, the mixer 30 is a Venturi mixer, formed substantially by a Venturi tube 32. Unlike a conventional Venturi mixer, the mixer 30 also has an adjustment component 34, which is positioned in the Venturi tube 32 and can be driven to change a gas flow area in the Venturi tube, thereby adjusting an air quantity and a fuel gas quantity.

Specifically, as shown in the figures, the Venturi tube 32 is tubular overall, extending in a central axis direction A thereof. A Venturi tube inlet is an air inlet 321, which is connected to the air channel 10, and thereby receives air blown in by the fan 14. An outlet of the Venturi tube 32 is a gas mixture outlet 323. A fuel gas inlet 322 is formed at a throat 325 of the Venturi tube 32; the fuel gas inlet is connected to the fuel gas channel 20, in order to receive a fuel gas input. A gas mixture formed by fully mixing fuel gas introduced at the throat 325 and air inputted at the air inlet 321 is outputted through the gas mixture outlet 323 to the combustion furnace 40.

As shown in FIG. 3, the adjustment component 34 is positioned in a diffusion section of the Venturi tube 32, i.e. downstream of the throat 325. The adjustment component 34 has a radial size extending perpendicular to the central axis direction A, and can obstruct air/mixed gases in the Venturi tube 32. Moreover, the adjustment component 34 can reciprocate in the central axis direction of the Venturi tube 32, i.e. move towards the throat 325 or move away from the throat 325. The closer the adjustment component 34 is to the throat 325, the narrower an annular gap between the adjustment component 34 and an inner wall of the Venturi tube 32 is, and a flow speed at which a gas stream flows through the gap can increase. FIG. 3 shows a situation where the adjustment component 34 is in tight abutment with the throat 325; this is a limit position, at which the gas stream is virtually unable to pass.

FIG. 4 shows a situation where the adjustment component 34 is remote from the throat 325. The further away the adjustment component 34 is from the throat 325, the larger the annular gap between the adjustment component 34 and the inner wall of the Venturi tube 32 is; the flow rate at which the gas stream flows through the gap increases and the flow speed can decrease. Thus, the adjustment component 34 can change the gas flow cross-sectional area in the Venturi tube by moving towards or away from the throat 325, thereby realizing flow rate adjustment.

As shown in FIGS. 2-4, in the Venturi tube, air enters through the air inlet 321, and experiences a reduction in static pressure when passing through the throat 325. Fuel gas enters the mixer 30 via the fuel gas inlet 322 at the throat 325, to realize initial mixing. The initially mixed gas stream then passes through the annular gap between the adjustment component 34 and the inner wall of the Venturi tube 32 and undergoes further mixing; finally, the mixed gases are outputted through the gas mixture outlet 323 to the combustion furnace 40. By moving the adjustment component 34, the flow area of the annular gap can be changed according to the size of the load.

In some embodiments, when the load decreases, the adjustment component moves against the gas flow direction (towards the throat), the area of the annular gap decreases, and the flow speed increases, thereby maintaining a high flow speed and high flow resistance at low flow rate/low load too; the Reynolds number increases, and the turbulence effect increases, ensuring that there is likewise a better mixing result when the heat setting in the combustion furnace is low. In addition, the mixer having dynamic adjustment capability as described above can simultaneously realize the functions of mixing and flow rate adjustment, thereby reducing the number of mixer components, and reducing costs to a certain degree.

In some embodiments, the adjustment component 34 is a conical valve plug, and a conical outer surface thereof at a side facing towards the throat 325 fits an inner surface of the Venturi tube 32 close to the throat 325. Having a conical surface facing against the gas stream facilitates the passage of the gas stream. At the same time, the fact that the conical outer surface fits the inner surface of the Venturi tube enables the gas stream to flow within a long and narrow gap, thereby effectively increasing the flow speed, without excessively impeding the flow of gases.

The adjustment component 34 as shown in FIGS. 2-4 may be positioned in the Venturi tube, and driven for adjustment, in several different ways, and various shapes are possible for the adjustment component 34 itself. A purely demonstrative explanation is given below, taking the instances shown in FIGS. 2-4 as examples; however, as those skilled in the art will understand, the way in which the adjustment component 34 is driven and the shape thereof are not limited to the situations shown in FIGS. 2-4.

In the examples shown in FIGS. 2-4, the adjustment component 34 has a drive mechanism 36, the drive mechanism 36 comprising a central shaft 361 and a transmission assembly 363. The central shaft 361 extends in the central axis direction A and can reciprocate in the central axis direction. The adjustment component 34 is fitted around and fixed to the central shaft 361. The adjustment component 34 can move as the central shaft 361 moves. The transmission assembly 363 has one end connected to the central shaft 361 and another end connected to an actuator 60. The transmission assembly 363 can impel the central shaft 361 to move under the driving action of the actuator 60.

In the embodiments shown in FIGS. 2-4, the transmission assembly 363 further comprises a transmission shaft 363-1 and a shaft levering device 363-2. The transmission shaft 363-1 can rotate under the driving action of the actuator 60, i.e. rotate about a direction perpendicular to the central axis. The shaft levering device 363-2 is connected to the transmission shaft 363-1 and the central shaft 361 respectively. The shaft levering device 363-2 serves as a connection member and a drive conversion member, being capable of converting the rotation (angular travel) of the transmission shaft 363-1 to linear movement (straight travel) of the central shaft 361 in the central axis direction.

As shown in FIGS. 2-4, the shaft levering device 363-2 may be substantially U-shaped; the bottom of the U-shape thereof is fitted around the transmission shaft 363-1 in a fixed manner, such that the shaft levering device 363-2 can rotate synchronously with the transmission shaft 363-1. The shaft levering device 363-2 has two lever parts T, which extend in a direction perpendicular to the transmission shaft and are arranged to be spaced apart parallel to one another. The two lever parts T are configured such that the central shaft 361 can be adapted to be positioned therebetween. Each lever part T has a slot hole L in a length direction thereof. A removable connecting rod R is further provided at the opening of the U-shape of the shaft levering device, the connecting rod being adapted to pass through the slot holes L of the two lever parts T and a through-hole in the central shaft 361 positioned between the two lever parts T. The connecting rod R is arranged substantially parallel to an axial direction of the transmission shaft 363-1. Thus, when the transmission shaft 363-1 rotates due to the driving action of the actuator 60, the lever parts T of the shaft levering device 363-2 swing under the driving action of the transmission shaft 363-1, thereby driving the central shaft 361 to undergo linear displacement due to the action of the connecting rod R.

A particular structure of a mixer incorporating teachings of the present disclosure has been described in detail above in conjunction with the examples shown in FIGS. 2-4. However, those skilled in the art will understand that the adjustment component of the mixer could also be non-conical, depending on the actual application circumstances. For example, the adjustment component could be a blocking component extending in a direction perpendicular to the central axis, or the adjustment component could also be hemispherical or another shape. In the examples of FIGS. 2-4, the adjustment component 34 is connected to a central shaft 361 in a fixed manner and moves under the driving action of the central shaft.

In some embodiments, the adjustment component 34 may be pushed directly by a linear actuator without the need for a central shaft; alternatively, a linear actuator may push the central shaft 361 directly. If the rotary actuator 60 continues to be used, the central shaft 361 could also be driven by the actuator by gear meshing, e.g. a gear is fitted around the transmission shaft 363-2 and the central shaft 361 has a straight rack capable of meshing with the gear. Optionally, the transmission assembly 363 could also be disposed outside the Venturi tube. Optionally, the central shaft could also be eliminated; the adjustment component could also be supported on the inner wall of the Venturi tube, and realize driven adjustment in a mechanically adjustable fashion.

The mixers shown in FIGS. 2-4 may be used in the combustion system shown in FIG. 1. The combustion system having the mixer 30 described above is described in detail below by returning to FIG. 1. As shown in FIG. 1, in the downstream-premixed combustion system 100, air enters the fan 14 through the air filter 12, and is then blown into the air inlet 321 of the mixer 30 by the fan 14. Fuel gas enters the fuel gas inlet 323 of the mixer 30 through a proportional control valve 22; after being mixed in the mixer 30, the air and fuel gas enter a head of the combustion furnace through the gas mixture outlet 325. In the combustion furnace, the ignitor performs ignition such that the mixed flammable gases are burned. In the example of FIG. 1, the combustion controller 50 may adjust a gas flow rate according to a preset parameter thereof (e.g. a load parameter), i.e. drive the adjustment component 34 to move backwards and forwards by controlling the actuator 60, to realize adjustment of air quantity and fuel gas quantity, while ensuring uniform mixing.

In some embodiments, the combustion system 100 further comprises a sensor 72 positioned in the combustion furnace. The sensor 72 can detect temperature and/or pressure in the combustion furnace. An output of the sensor 72 is connected to the combustion controller 50. The combustion controller 50 adjusts the flow rate according to data sensed by the sensor, i.e. drives the adjustment component 34 to move backwards and forwards by controlling the actuator 60, to realize automatic adjustment of air quantity and fuel gas quantity, while ensuring uniform mixing.

As shown in FIG. 1, the combustion system 100 further comprises a proportional control valve 22, having one side connected to the air channel 10 for the purpose of acquiring an air pressure of the air channel, and another side connected to the fuel gas channel 20 for the purpose of acquiring a fuel gas pressure in the fuel gas channel. The proportional control valve 22 can maintain constant pressure differences at an air side and a fuel gas side. In other words, when an air flow rate in the air channel falls, the proportional control valve 22 can cause the fuel gas side to change accordingly, and can thereby maintain a highly precise air-fuel ratio at all times.

In some embodiments, at the air side, the proportional control valve 22 detects the difference between full pressure at the air inlet inside the mixer 30 and static pressure at the throat of the Venturi tube. At the fuel gas side, the proportional control valve 22 acquires the difference in fuel gas pressure before and after a fuel gas single valve 24 in the fuel gas channel. The proportional control valve 22 maintains equality of differential pressures at the air side and the fuel gas side by means of a diaphragm mechanical structure, thereby ensuring that the air-fuel ratio is constant; even if a blockage occurs at the air side, the air-fuel ratio can be maintained automatically without the need for a compensating apparatus. Such a diaphragm mechanical structure has balanced pressure differences, a simple structure, and fast and reliable response, as well as having simple control and a high level of safety. Optionally, the proportional control valve could also be replaced with an electronic differential pressure control apparatus, simultaneously detecting air and fuel gas pressures; a pressure difference control device adjusts the degrees of opening of an air valve and a fuel gas valve after receiving a signal.

In some embodiments, the combustion system 100 further comprises an ionic probe 74, which is positioned in the combustion furnace to perform flame testing; the ionic probe can sense whether the flame has been extinguished, and output a sensing result to the combustion controller 50. The combustion controller 50 can control the delivery of mixed gases according to the sensing result fed back by the ionic probe.

In some embodiments, the combustion system 100 further comprises a gas pressure sensor 76 positioned close to the fan 14; the gas pressure sensor can sense a change in gas pressure, and in turn determine whether the fan is operational. The gas pressure sensor 76 is likewise connected to the combustion controller 50, in order to pause the subsequent igniting operation when the fan 14 is unable to operate normally, and instead restart the fan 14.

In some embodiments, the combustion system 100 further comprises an HMI panel 90, which is connected to the combustion controller 50, to make it easy for control personnel to obtain a current operating state and control the combustion system via the HMI panel 100.

Due to the fact that the combustion system 100 shown in FIG. 1 and described above uses the mixer having the adjustment component, the downstream-premixed combustion system can adjust the flow rate according to the size of the load. When the combustion furnace is at a low heat setting, the flow rates of air and fuel gas are low; in this case, the adjustment component will move against the direction of flow (towards the throat), in order to reduce the flow area of the gas stream, increase the gas flow speed and resistance, and improve the low heat setting mixing result, such that the adjustment ratio attains a high value (e.g. greater than 5:1). When the combustion furnace is at a high heat setting, the flow rates of air and fuel gas are high; in this case, the adjustment component will move in the direction of flow (away from the throat), in order to increase the flow area of the gas stream, reduce the gas flow speed and resistance, and improve the mixing result, such that the adjustment ratio stays at a high value (e.g. greater than 5:1).

In general, the mixer requires that the fuel gas pressure and air pressure be substantially equal; only then can the fuel gas and air easily enter the mixer to undergo premixing. In the combustion system 100 described above, the interior of the mixer 30 is a Venturi reduction/enlargement structure. Using such a structure, when air flows through the mixer 30, due to the fact that the gas flow area at the throat thereof is reduced, the gas flow speed increases, the dynamic pressure increases, and the static pressure decreases. In the mixer 30, fuel gas enters the mixer through the inlet (fuel gas inlet) of a low static pressure zone at the throat 325; at this time, the fuel gas only needs a low gas supply pressure in order to be injected into the mixer, about 2 Kpa lower than a conventional fuel gas supply pressure. This point is very favorable for application scenarios with relatively low fuel gas supply pressures.

In the combustion system described above, in addition to using the mixer capable of automatically adjusting the flow rate, the proportional control valve is also used to maintain a constant air-fuel ratio at all times. The high adjustment ratio can improve the mixing result, and the stable air-fuel ratio can maintain effective full combustion, avoiding excessive levels of harmful emissions (e.g. NOx and CO) due to incomplete combustion.

The teachings of the present disclosure have been displayed and explained in detail above by means of the accompanying drawings and example embodiments, but the scope of the present disclosure is not limited to these disclosed embodiments. Based on the embodiments described above, those skilled in the art will know that further embodiments, also falling within the scope of protection of the present disclosure, could be obtained by combining code checking means in different embodiments above.

What is claimed is:

1. A mixer disposed in a fuel gas combustion system and mixing air and fuel gas to form flammable mixed gases, the mixer comprising:

a Venturi tube having an air inlet, a fuel gas inlet, a gas mixture outlet, a central axis direction, and a throat positioned between the air inlet and the gas mixture outlet in the central axis direction, wherein the fuel gas inlet is disposed at the throat; and an adjustment component disposed in the Venturi tube downstream of the throat, the adjustment component drivable to move towards or away from the throat in the central axis direction, thereby changing a flow area of gas in the Venturi tube;

wherein the adjustment component includes a conical valve plug with a conical outer surface thereof at a side facing towards the throat and fitting an inner surface of the Venturi tube at the throat;

a drive mechanism for driving the adjustment component, wherein the drive mechanism includes: a central shaft positioned in the Venturi tube to reciprocate in the central axis direction, the adjustment component being fitted around and fixed to the central shaft; and a transmission assembly having a first end connected to the central shaft and a second end connected to an actuator, the transmission assembly impelling the central shaft to move under the driving action of the actuator;

wherein the transmission assembly includes: a transmission shaft extending in a direction perpendicular to the central axis direction and rotating under the driving action of the actuator; and a shaft levering device having a first end connected to the transmission shaft in a fixed manner and a second end connected to the central shaft;

wherein the transmission shaft rotates and drives the shaft levering device, the shaft levering device in turn pushing the central shaft to move linearly along the central axis;

the shaft levering device is fitted around the transmission shaft in a fixed manner;

the shaft levering device has two lever parts extending in a direction perpendicular to the transmission shaft;

the two lever parts are spaced apart parallel to one another and configured such that the central shaft is adapted to be positioned therebetween;

each lever part having a slot hole in a length direction thereof;

the mixer further comprises a connecting rod adapted to pass through the slot holes of the two lever parts and a through-hole in the central shaft positioned between the two lever parts, the connecting rod parallel to the transmission shaft.

2. A fuel gas combustion control system comprising:

an air channel with a fan disposed therein for blowing air;

a fuel gas channel for supplying fuel gas;

a mixer comprising:

a Venturi tube having an air inlet, a fuel gas inlet, a gas mixture outlet, a central axis direction, and a throat positioned between the air inlet and the gas mixture outlet in the central axis direction, wherein the fuel gas inlet is disposed at the throat; and an adjustment component disposed in the Venturi tube downstream of the throat, the adjustment component drivable to move towards or away from the throat in the central axis direction, thereby changing a flow area of gas in the Venturi tube;

wherein the adjustment component comprises a conical valve plug with a conical outer surface thereof at a side facing towards the throat and fitting an inner surface of the Venturi tube at the throat;

the air inlet is connected to the air channel, the fuel gas inlet is connected to the fuel gas channel, and the gas mixture outlet is connected to a combustion furnace;

an actuator connected to the mixer and used for driving the adjustment component in the mixer; and a combustion controller connected to the actuator and driving the adjustment component by controlling the actuator in order to adjust a gas flow rate.

3. The system as claimed in claim 2, further comprising a first sensor for sensing a temperature and/or pressure in the combustion furnace;

wherein the combustion controller is connected to the first sensor and controlling the actuator in response to sensing data of the first sensor.

4. The system as claimed in claim 2, further comprising a proportional control valve causing a differential pressure of the air channel and a differential pressure of the fuel gas channel to be constant according to a ratio by means of a diaphragm mechanical structure.

5. The system as claimed in claim 2, further comprising a second sensor disposed at the fan and used for sensing an air speed;

wherein the combustion controller is connected to the second sensor and pauses ignition and restarts the fan in response to the second sensor.

6. The system as claimed in claim 2, further comprising a human-machine interaction panel connected to the combustion controller.

* * * * *